United States Patent [19]
Chilinski et al.

[11] Patent Number: 5,761,521
[45] Date of Patent: Jun. 2, 1998

[54] PROCESSOR FOR CHARACTER STRINGS OF VARIABLE LENGTH

[75] Inventors: Herbert Chilinski; Klaus Joerg Getzlaff, both of Schoenaich; Wilhelm Ernst Haller, Remshalden; Ralph Koester, Holzgerlingen, all of Germany

[73] Assignee: International Business Machines Corporation, Armonk, N.Y.

[21] Appl. No.: 619,496

[22] PCT Filed: Sep. 12, 1994

[86] PCT No.: PCT/EP94/03045

§ 371 Date: Mar. 26, 1996

§ 102(e) Date: Mar. 26, 1996

[87] PCT Pub. No.: WO95/10803

PCT Pub. Date: Apr. 20, 1995

[30] Foreign Application Priority Data

Oct. 8, 1993 [DE] Germany ............... 43 34 294.9

[51] Int. Cl.$^6$ ............................................. G06F 7/00
[52] U.S. Cl. .................. 395/800.01; 340/146.2; 364/715.11
[58] Field of Search ............... 395/800.01, 376; 707/6, 7; 364/715.01, 715.06, 715.11; 371/22.1, 68.1; 382/103, 165, 170, 173, 181; 340/146.2

[56] References Cited

U.S. PATENT DOCUMENTS

| | | | |
|---|---|---|---|
| 4,094,001 | 6/1978 | Miller | 340/146.2 |
| 4,575,795 | 3/1986 | Boothroyd et al. | 395/566 |
| 4,760,523 | 7/1988 | Yu et al. | 707/7 |
| 4,896,133 | 1/1990 | Methvin et al. | 340/146.2 |
| 5,212,697 | 5/1993 | Morita | 371/68.1 |
| 5,222,225 | 6/1993 | Groves | 395/842 |
| 5,329,405 | 7/1994 | Hou et al. | 707/6 |
| 5,367,705 | 11/1994 | Sites et al. | 395/800.41 |
| 5,440,753 | 8/1995 | Hou et al. | 395/800.01 |
| 5,495,592 | 2/1996 | James et al. | 711/212 |
| 5,568,624 | 10/1996 | Sites et al. | 395/564 |

FOREIGN PATENT DOCUMENTS

| | | |
|---|---|---|
| 0136174 | 4/1985 | European Pat. Off. |
| 3507100 | 8/1986 | Germany |

OTHER PUBLICATIONS

37th IEEE Computer Society International Conference, Compcon Spring '92, Feb. 24, 1992 entitled "Pathlength Reduction Features in the PA-RISC Architecture".

*Primary Examiner*—Alpesh M. Shah
*Attorney, Agent, or Firm*—Lynn L. Augspurger

[57] ABSTRACT

A processor for character strings A, B of variable length serves for the fast detection of match, mismatch and comparative difference conditions between them. The character strings, whose lengths are delimited by character string termination marks, are split into consecutive substrings with a byte count corresponding to the data path width, and processed to detect a match, a mismatch and an end-of-byte mark. Each substring is routed via operand registers (16,18) in parallel to an arithmetic unit (20), a logic unit (22) and a comparator unit (24) and simultaneously processed. The arithmetic unit (20) subtracts one substring from the other substring, the logic unit (22) compares both substrings with each other and the comparator unit (24) compares the bytes of both substrings with the contents of a marking register (26), previously set to the end-of-string mark. These operations are executed in one machine cycle. Output signals from the comparator unit serve to indicate the equality of both substrings, output signals from the logic unit serve to indicate the inequality of both substrings and a carry signal from the arithmetic unit serves at the same time to indicate which of the two substrings is the greater or the lesser.

7 Claims, 4 Drawing Sheets

PROCESSOR FOR CHARACTER STRINGS OF VARIABLE LENGTH

BACKGROUND OF THE INVENTION

The invention concerns a processor for character strings of variable length, comprising a system of storage units for storing character strings, which are pairwise addressable by program instructions, and from which substrings corresponding to the data path width are transferred into two operand registers, comprising an arithmetic-logic unit for executing processing operations, comprising a condition code circuit for storing signals derived from the results of the processing and which control program branching, and comprising a control unit, which sequentially addresses the substrings of the pairs of character strings in the storage unit and controls the operation of the units and the transfers between them in consecutive machine cycles.

Computer applications for querying databases, and applications in the field of text processing and the support of higher-level programming languages necessitate a considerable amount of character string processing. Generally speaking, a character string is a data element consisting of a variable length sequence of bytes. The length of a character string can range from one to a number of bytes, limited solely by the size of a storage unit. It can be determined by a length code, or through a special character contained in the character string and indicating the end of the string. It is normal for character string instructions to have to process character strings of different lengths. Frequent kinds of processing are the comparison of two character strings and the detection of the first pair of bytes to match or differ from one another, the detection of some character string within a character string A and in a character string B, the search for a substring within a character string, or the displacement of a character string to another storage position.

Complex instructions for character strings have three operands: the address of a first character string A, the address of a second character string B, where A and B have variable lengths and the address of an end-of-string byte as third operand, which marks the end of character strings A and B. The execution of such an instruction necessitates a series of operations. The character string representing the first operand is compared bytewise from left to right with the character string representing the second operand until the detection of a pair of bytes that do not match, or an end-of-string byte. Both character strings are equal if the end-of-string byte in both of them is found in the same bit position. If the end-of-string byte is detected in only one of the two character strings, then this character string is the shorter and is regarded as the lesser. If on the other hand, instead of an end-of-string byte, a mismatched pair of bytes is detected, both of these bytes must be compared in order to determine which of the two operands is the lesser. Execution of the instruction therefore comprises the following phases: search for the end-of-string byte in character string A, search for the end-of-string byte in character string B, comparison of both character strings for mismatch, and subtraction of one character string from the other to determine which character string is the lesser. The execution of these different operations necessitates a considerable overhead in microprocessor control and processing time.

It is well-known that circuits permitting a number of bytes to be compared in parallel are superior for speeding up the execution of character string instructions (U.S. Pat. No. 4,896,133). With such an arrangement, it is possible to detect a particular control character in a character string by a comparison operation, in which copies of this control character are stored at all byte positions of an operand register and are simultaneously compared with eight bytes of the string. If a match is detected, branching to the next program instruction occurs under microprogram control. In the alternative case, the comparison is repeated with a further character string. The comparison operations can be executed by a bank of exclusive-NOR circuits or by the arithmetic-logic unit of the processor, in which this arrangement is used. The arrangement is however only suited to the parallel execution of some of the phases of operation explained above.

In a conventional data processing system, it is also state of the art to provide special character string instructions, which are executed by microprogram by utilising the mechanisms present in the central processor (U.S. Pat. No. 4,556, 951). In these instructions, the length of the character strings to be processed is specified by a length code contained in the instructions and representing the number of bytes over which the string extends. The character comparisons are executed through operations of the arithmetic-logic unit of the processor. In a system such as this, the condition codes generated as part of the output are used for indicating a match or mismatch of character strings, substrings or individual characters, and for controlling the branching of subsequent parts of the program. Even this arrangement necessitates a considerable overhead for the numerous microprogram steps essential for executing the phases of operation explained in the introduction.

It is the concern of this invention to specify an improved processor for character strings, which avoids these disadvantages and makes greater use of the principle of parallel processing. The features of the invention for solving this problem are identified in Patent Claim 1. Claims 2 to 7 specify configurations and advanced forms of the invention which are of benefit.

BRIEF DESCRIPTION OF THE DRAWINGS

With the aid of diagrams, an example of a preferred configuration of the invention is described below, showing in.

DETAILED DESCRIPTION OF THE INVENTION

Figure 1:
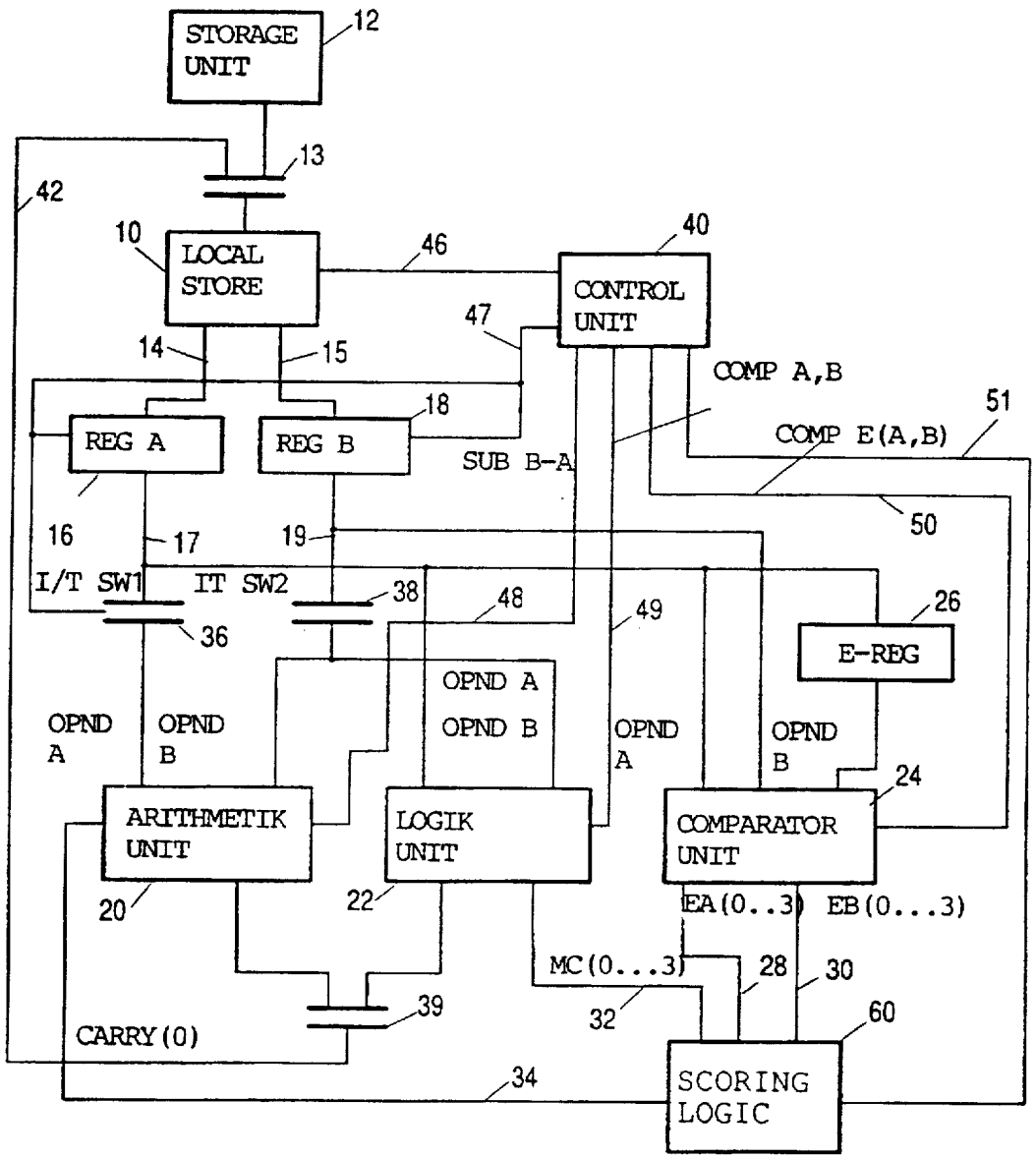
FIG. 1 a block diagram of a character string processor corresponding to the invention, FIG. 2 a table of match and mismatch conditions during the processing of character strings to explain the method of operation of the configuration in FIG. 1, FIG. 3 a block diagram of the result scoring logic for use in the configuration of FIG. 1, and FIG. 4 a flow diagram of a microprogram as used in the control unit of the processor in FIG. 1.

The processor of FIG. 1 comprises a local memory 10, an arithmetic unit 20, and a control unit 40. These units are built in a conventional way and are not therefore described further here. Store 10 is a high-speed store of limited capacity, mounted on the processor chip and connected via multiplexer 13 to a storage unit 12, comprising separate semiconductor chips in a conventional manner. Storage unit 12 contains a large number of character strings, which taken as a whole could form a database, for example. Each of these character strings consists of a number of bytes, each one of which represents a character. However, another relationship between characters and bytes can also be chosen: for example, the representation of two characters by one byte. The number of characters belonging to a character string is variable, and can be chosen freely within wide limits. A limitation merely represents the capacity of the store. The length of a character string is determined by an end-of-string character, which is represented by the last byte of the string and indicates the end of the string during processing. The current application program contains character string instructions which do the processing; the instructions usually address, and control the processing of, two character strings of different lengths and which are to be related to one another. Typical forms of processing are testing for equality or inequality, determining which character string is the greater or lesser, or comes before the other character string in a pre-defined ordering scheme, such as for example an alphabetical order. This is done by testing individual bytes of both character strings in pairs, in order to establish the first byte position with mismatched bytes, going from left to right. The character string instructions have three operands: the address of a first character string A, the address of a second character string B and the address of an end-of-string byte, as third operands, as chosen by the programmer, to mark the end of both character strings, which are usually of different lengths. An application program containing the character string instructions is stored in store 12. The microprogram which executes the character string instruction is in a control store, which is not shown and is part of control unit 40. Local store 10 is loaded gradually from store 12, taking a part of the character string at a time.

Using busses 14 and 15, the output of store 10 is connected to operand registers 16 and 18, each of which is designed to accept a substring of four bytes. Under the control of control unit 40, registers 16 and 18 are simultaneously loaded in one machine cycle, beginning each time with the first substrings of two character strings A and B to be processed; A and B are addressed by the operand addresses in the current character string instruction. In the following description these substrings are also called A and B, where substring A is stored in register 16 and substring B is stored in register 18. Using busses 17 and 19, the arithmetic unit 20, a logic unit 22, and a comparator unit 24 are connected in parallel with one another at the output of these operand registers 16 and 18. Via busses 17 and 19 respectively, the substrings A and B stored in the registers are routed simultaneously to these units and received by them.

The comparator unit 24 shows a third input, connected to the output of a further register 26, in which is stored the end-of-string mark, defined as the third operand by the character string instruction; the mark is received from store 10 via register 16 in a preliminary operation. This occurs before the substring operands are routed to units 20, 22, and 24. The comparator unit 24 performs a parallel multiple comparison. It compares the mark in register 26 with every byte of substring A and with every byte of substring B. This comparison operation is done with the aid of exclusive-OR circuits which are not shown. The comparator unit 24 has two outputs 28 and 30, each with four lines. On the output lines 28 there appears respectively a signal EA(0), EA(1), EA(2) or EA(3), if one of the four bytes of substring A matches the end-of-byte mark in register 26. Each of these signals is assigned a byte position in substring A and provides an indication that the byte fed to this position in unit 24 matches the end-of-string byte in register 26. Similarly, on the output lines 30 there appears respectively a signal EB(0), EB(1), EB(2) or EB(3), if one of the four bytes of substring B matches the end-of-string mark in register 26. Here too, the signal indicates a match for the assigned byte position in substring B.

The logic unit 22 selectively performs varying logical operations on the operands, such as AND, OR, exclusive-OR. The comparison operation is only of interest here in detecting the absence of a match in the input bytes of the operands. The comparison is between the contents of the four byte positions of operand A and the contents of the four corresponding byte positions of operand B. This comparison is also done in parallel. Since it is intended to detect a mismatch there, an appropriate logical operation for performing the comparison is the exclusive-OR, which will produce an output signal for every pair of operand bits if both bits are unequal. In relation to an operand byte, this means that the output signal of one bit position is sufficient to indicate a mismatch for the pair of operand bytes concerned. Logic unit 22 produces four signals on output 32—MC(0), MC(1), MC(2) and MC(3), each of which is assigned to a byte position of both operands A and B. The occurrence of one or more of these signals indicates that the operand bytes of the assigned position are unequal.

Arithmetic unit 20 performs the subtraction B−A. This is done by two's-complement addition of substring A to substring B. To do this, substring A is routed from register 16 to the A operand input of arithmetic unit 20 via complementer 36. During this, complementer 38 connected to the B operand input remains disabled. Arithmetic unit 20 has a carry output line 34 at the highest byte position. This is the output signal of unit 20 that is of interest in the present context. A carry "1" signal on line 34 indicates that operand A is less than operand B, and the absence of such a signal indicates that operand A is greater than operand B. For the operation of arithmetic unit 20, substrings A and B are considered to be arithmetic operands. The following examples illustrate the operation of arithmetic unit 20 when these signals are generated:

| Byte | 0 | 1 | 2 | 3 |
|---|---|---|---|---|
| String B hex | 00 | AA | 07 | xx |
| String A hex | 00 | AA | 06 | xx |
| String B binary | 0000 0000 | 1010 1010 | 0000 0111 | xxxx xxxx |
| String A binary | 0000 0000 | 1010 1010 | 0000 0110 | xxxx xxxx |
|  |  |  | mismatch byte 2 |  |
| String B binary | 0000 0000 | 1010 1010 | 0000 0111 | xxxx xxxx |
| String A binary | 1111 1111 | 0101 0101 | 1111 1001 | xxxx xxxx |
| Carries | 1 match (0) | 1 match in byte (0) | 1 match in byte (0) | 1 2's complement |

The top line of the example gives the byte position of the character strings (substrings) A and B which are reproduced in the next two lines in hexadecimal representation, and in the two lines beneath them in binary representation. The "x" in bit position 3 signifies that the bytes in this position have no influence on the result, and therefore any character can be there. It is clear that there is a mismatch (MC) in byte position 2 of both strings, and that the value of string A in this position is less than the corresponding value in string B. The binary representation of string B is repeated in the third from last line, while the penultimate line, string A, is rendered in 2's complement representation, in the same way as it is fed to the operand A input of the arithmetic unit for execution of an addition. The last line shows the carries, which occur during addition. Initially a carry is fed to the lowest byte position, that is byte 3, as part of the two's complement generation. This is done in a well-known way through a signal from control unit 40 on line 48; the signal also controls arithmetic unit 20 for executing a subtraction. In byte position 2 a carry is produced, which runs into byte position 1, and from there also into position 0, which in its turn produces a carry on line 34. This carry serves to indicate that string A is less than string B. At the same time, logic unit 22 has been comparing strings A and B, which have been fed to it in true (i.e. non-complimented) binary representation, as in lines 4 and 5 of the above example. As the result of this comparison, logic unit 22 produces a MC(2) signal on its output line, indicating that the bytes in position 2 are unequal. This indication and the carry on line 34 are independent of the bytes in byte position 3. If this position in the above example does not produce a carry, then the result is as shown. Nothing is changed by that if it is assumed that a carry occurs in position 3. In this case the byte of string B in position 2 will of course increase by one. However this does not alter the fact that a carry is still generated in this position, leading to a carry signal on line 34. Also if the bytes in position 3 are unequal, resulting in a MC(3) outputsignal in logic unit 22, next to the MC(2) signal described, then this has no effect, since it only depends on the mismatch signal of the byte position which lies nearest to the start of the string. It is therefore clear that bytes to the right of the mismatch position have no effect on the result of the operation of units 20 and 22. It remains to be added that the normal results occurring at the outputs of units 20 and 22, that is the algebraic difference A−B and the exclusive-OR operation of strings A and B, are of no significance for the invention configuration. For normal operations of both units 20 and 22 these results are transmitted to the local store via multiplexer 39, bus 42 and multiplexer 13, and stored there.

The operations of the configuration in FIG. 1 are controlled by control unit 40. This unit generates control signals on lines 46 to 51, leading to the separate units. These signals are generated at preset clock intervals. Access is made to store 10 over bus 46 in order to load registers 16 and 18 with four bytes of character strings A and B respectively. A control signal on line 47 causes these bytes to be transferred to units 20, 33 and 24, as well as enabling comparator unit 36. A subtraction control signal SUB B-A occurs on line 48 at the same time as both a control signal COMP(A,B) on line 49 and a control signal COMP EZ (A,B) on line 50: COMP(A,B) enables the logic unit to perform an exclusive-OR operation; COMP EZ (A,B) transfers the end-of-string mark EZ from register 26 to the comparator unit, enabling the latter for execution of the multiple comparison described above. Operations initiated by the control signals on lines 47 to 50 take up one machine cycle. At the end of this cycle the result of processing substrings A and B is available in the form of the indicator signals EA(0 3), EB(0 3), MC(0 3) and CARRY(0) on lines 28,30, 32 and 34. These signals go to an indicator circuit 60, which is explained with the aid of FIGS. 2 and 3.

Figure 2:
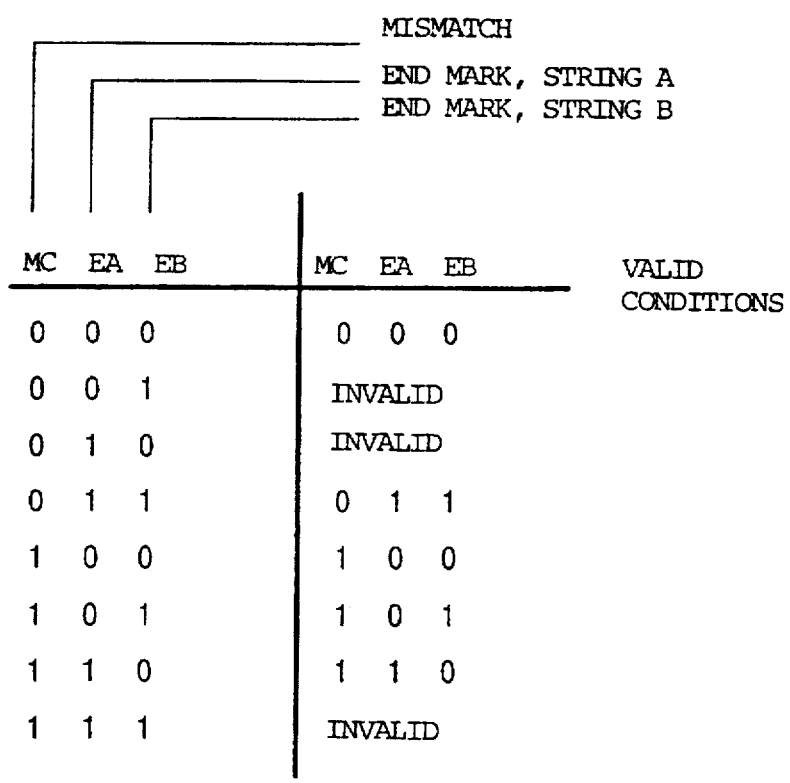

The left part of the table in FIG. 2 shows the pattern of possible combinations of signals MC, EA and EB, with valid signal combinations selected in the right part. Indicator logic 60 has a circuit 62 for truncating valid substrings and takes account of substring misalignment, as can occur when a physical storage limit is exceeded during access of the character strings in store 12. In addition, the indicator logic 60 has a circuit 64 for priority determination, as well as a select circuit 66, controlled by the carry signal on line 34. Circuit 62 for truncating valid substrings comprises AND circuits 72, 73 and 74, which are selectively conditioned over bus 70. Each of the four lines in busses 28, 30 and 32 from the output of units 24 and 22 are respectively connected to one of the AND circuits 72, 73 and 74, which deliver output signals on bus 76, corresponding to the signals on these lines, if a conditioning signal appears on bus 70 for all four bytes processed in these units. If, on the other hand, a store access has only loaded an incomplete substring A, B into registers 16 and 18, owing to the addressed storage range exceeding some storage limit, then control unit 40 disables any conditioning signal on those bus lines corresponding to the byte positions in which no significant byte was processed. For example, this could be bytes 2 and 3 to which lines 71 are allocated, so that there is no output signal on bus 70 from AND circuits 72, 73 and 74. The input connections to bus 76 are designated A0 to A3, B0 to B3 and M0 to M3, where connections are allocated as follows: A0–A3 to lines 28; B0–B3 to lines 30, and M0–M3 to lines 32. The priority logic 64 determines the following indicators: the byte position of an end-of-string character in substrings A or B; and the byte position of a mismatch between these substrings. This is done by AND circuits 82 to 85, which are preceded by inverters 78 to 80. For presentation reasons, part of the AND circuits and inverters have been omitted here. The AND circuit 82 receives an input signal M0 from the bus, indicating a mismatch in byte position 0. This signal is transmitted to a bus only if there are no signals A0, B0 present —i.e., if no end-of-byte character is indicated in the same byte position. In this event, AND circuit 82 is conditioned by output signals from the inverters78 preceding it. Similarly, AND circuit 83 transmits a mismatch signal M1 to bus 88 if an end-of-string character is neither indicated in byte position 0 nor in byte position 1, and no mismatch is indicated in byte position 0. In the same way, mismatch signals M2 and M3 are transmitted to bus 88 by AND circuits which are not shown. Signals A0 and B0 lead directly from bus 76 to bus 88. The AND circuit 84 transmits signal A1 onto bus 88 if there is neither an end-of-byte character nor a mismatch indicated for byte positions 0. An equivalent transmission of signal B1 occurs via AND circuit 85. In exactly the same way, the remaining end-of-string indicator signals A2, A3 and B2, B3 are transmitted to bus 88 via AND circuits (not shown), if in each case none of the lower byte positions indicates an end-of-byte character or mismatch. The signals A0 to A3, B0 to B3 and M0 to M3 from bus 88 are respectively combined into signals EA, EB and MC by OR circuits 89. The combined signals are routed over another bus 90 to the carry scoring logic 66, which is also connected with carry line 34 from the highest byte position of arithmetic unit 20. The carry scoring logic 66 has AND circuits 91, 93 and 94, and an inverter 92, and indicates on lines 95 and 96 respectively which of the two substrings A and B is the greater or the lesser. To do this, AND circuit 91 transmits the MC signal to line 95 if it has been conditioned by a carry signal on line 34. The output signal on line 95 indicates that substring A is less than substring B, and serves to set the condition code CC=01 in a latch circuit not shown. Signal MC is also transmitted via the AND circuit 93 to line 96 if no carry signal is present and inverter 92 supplies a condition signal to AND circuit 93. The output signal on line 96 indicates that substring B is less than substring A, and serves to set the condition code CC=10. In addition to this, AND circuit 94 delivers an output signal on line 97 if signals EA and EB occur together on bus 90; i.e., if an end-of-string character was detected in both substring A and in substring B. The signal on line 97 serves to set the condition code CC=00, indicating that both substrings are equal. In addition, signals EA and EB are routed from bus 90 to busses 98 and 99 to set condition codes CC=01 and CC=10. Both signals indicate end-of-strings in substrings A and B respectively. It is clear that these signals serve to set the same condition codes as the signals on lines 95 and 96; i.e., the end of substring A also indicates that substring A is less than substring B, and the end of substring B also indicates that substring B is less than substring A. Bus 100, connected with bus 88, concurrently indicates the byte position of a match detected during the last substring processing. This indication, arising directly from the input signals A0 to A3, and B0 to B3 of bus 88, is temporarily stored in a register, not shown in the figure, for use in the execution of subsequent program instructions.

Figure 4:
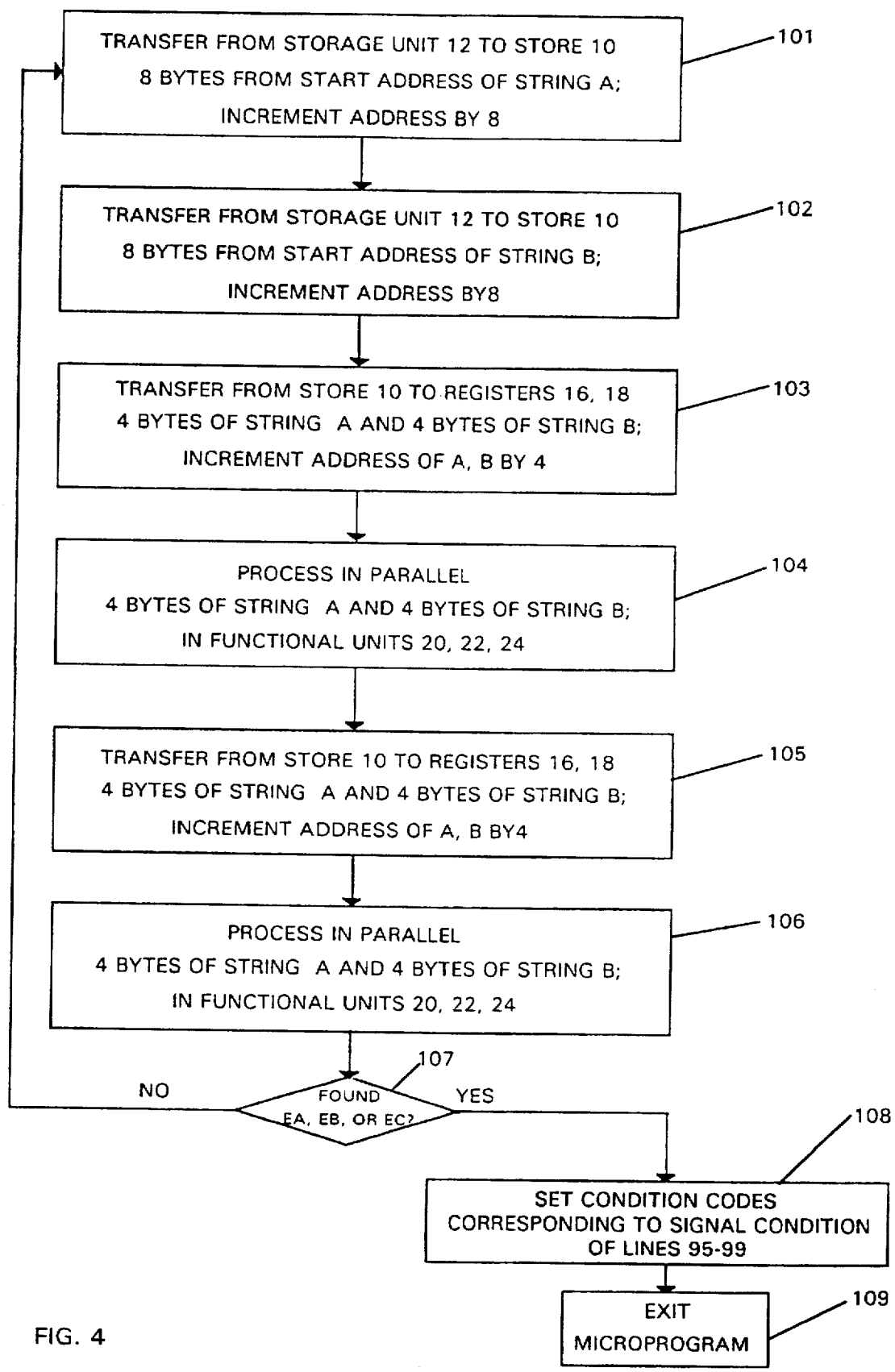

FIG. 4 shows a simplified representation of the essential steps of the microprogram routine which are repeatedly enabled in control circuit 40 whenever two character strings A and B are to be processed. This microprogram routine is stored as part of the microprogram of the processor in a store (not shown) of the control unit. Step 101 transfers the first eight bytes of character string A from storage unit 12 into local data store 10, beginning with the start address defined by each character string instruction to be executed. At the same time the start address is incremented by 8. The same operation takes place for character string B in step 102. Step103 transfers the first four bytes of character strings A and B in storage unit 10 into registers 16 and 18 respectively. This transfer is accomplished in one machine cycle. Next in step 104, the substrings of A and B in registers 16 and 18 are processed in parallel in units 20, 22 and 24 in the manner described .This processing operation is also accomplished in just one machine cycle. Step 105 loads another four bytes of character strings A and B from store 10 into registers 16 and 18 as new substrings of A and B. A new processing step 106 follows after this, equivalent to step 104. Branching step 107 then tests whether step 104 or 106 detected an output signal EA, EB or MC.

Figure 3:
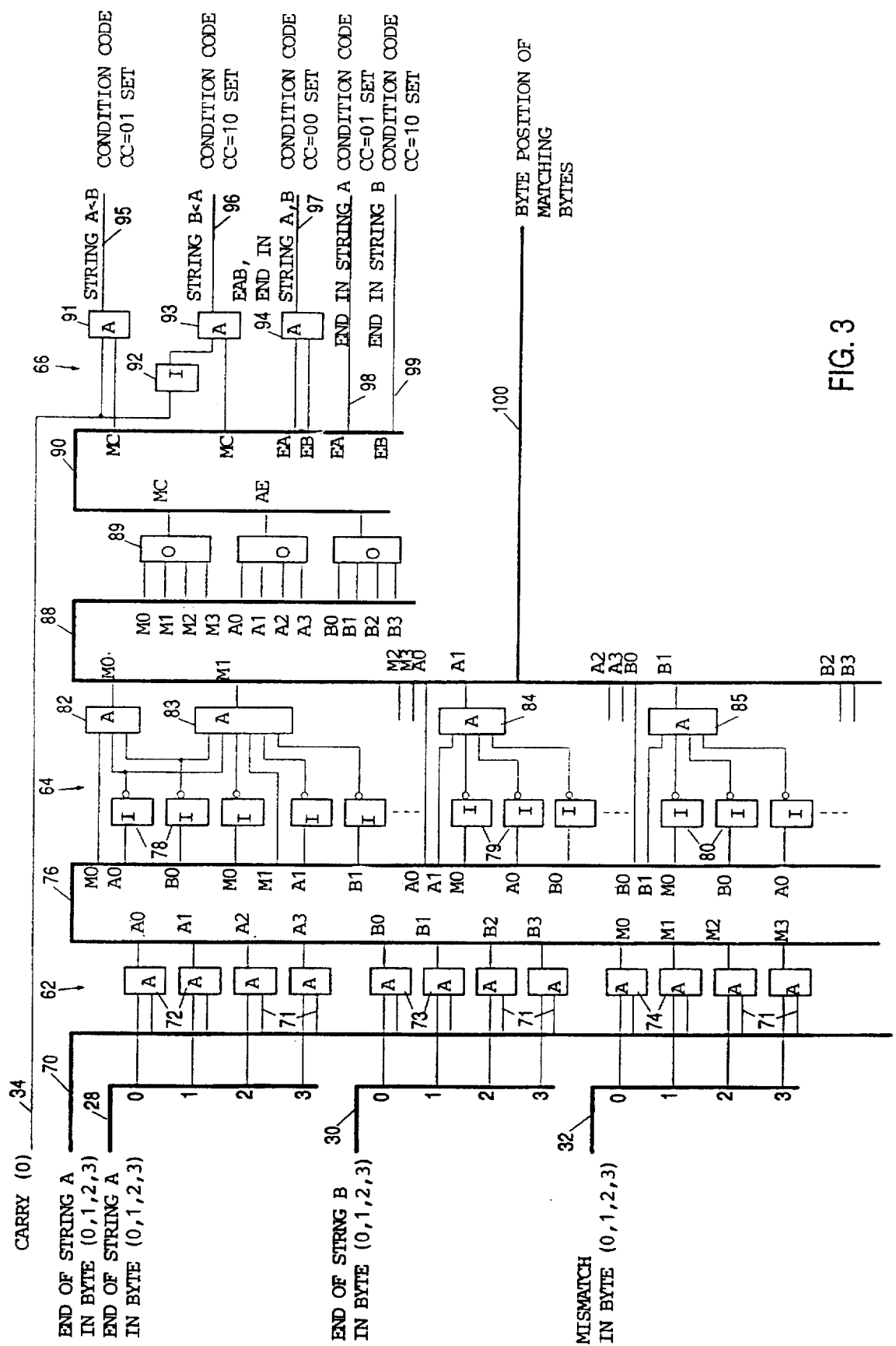

This is done by sampling the signal condition of lines 97, 98 and 99 (FIG. 3). If there is no output signal EA, EB or MC present, then the microprogram branches back to step 101 to access the next eight bytes in control unit 12. If on the other hand, such an output signal is detected, then this means that processing of character strings A and B has finished.

Normally this will not be straight after the first pass of the microprogram routine, as is the case in FIG. 4, but several such passes will be necessary in order to process longer strings. Irrespective of how many passes are necessary, step 107 will branch to step 108 on a YES result, where the condition codes CC will be set, corresponding to the signal condition of lines 95 to 99. The following step 109 terminates both the microprogram and the execution of the character string instruction. The next instruction of the current application command can be a branch instruction, which uses the condition codes CC set previously, in order to branch to a program control section; this reuses the processing result from the character string processing instruction, including the address of the mismatch byte position indicated on output bus 100.

We claim:

1. A processor for character strings of variable length, comprising a system of storage units for storing character strings, which are pairwise addressable by program instructions, and from which substrings corresponding to the data path width are transferred into two operand registers, comprising an arithmetic-logic unit for executing processing operations, comprising a condition code circuit for storing signals,which are derived from the results of the processing and serve to control program branching, and comprising a control unit, which sequentially addresses the substrings of the pairs of character strings in the storage unit and controls the operation of the units, as well as transfers between them in consecutive machine cycles, with the feature that the operand registers (16,18) are connected in parallel with an arithmetic unit (20), with a logic unit(22) and with a comparator unit (24), with the feature that a marking register (26) reloadable with an end-of-string character mark (E) is connected to a further input of the comparator unit (24), with the feature that the substrings stored in the operand registers (16, 18) are routed simultaneously to the arithmetic unit (20) for subtraction of one substring from the other substring, to the logic unit (22) for comparison of both substrings, and to the comparator unit (24) for comparison of the characters of both substrings with the contents of the marking register (26), and with the feature that the output signals of these units are available within the same machine cycle, output signals of the comparator unit serving to indicate the equality of both character strings or substrings, output signals of the logic unit serving to indicate inequality of both character strings or substrings, and a carry signal from the arithmetic unit serving to indicate which of the two character strings or substrings is the greater or the lesser.

2. The processor of claim 1, in which the characters are represented by bytes, with the feature that the comparator unit (24) is designed for parallel execution of a multiple comparison of the contents of the marking register (26) with every byte of both substrings, and exhibits an output line (28,30) for each substring (A,B), on which an end-of-string signal (EA, EB) is produced, if the contents of the marking register matches a byte in the substrings.

3. The processor of claim 1, with the feature that the logic unit (22) is designed to compare similarly positioned bytes of both substrings (A,B) in parallel, and exhibits an output line (32) for every byte pair, on which a mismatch signal (MC) is produced if the bytes do not match.

4. The processor of claim 1, with the feature that the arithmetic unit (20) is designed to add bytes in the same position in both substrings (A,B) in parallel, and exhibits a complementer (36) on one of its inputs, as well as a carry output line (34) at its highest byte position, on which a carry signal appears if substring (A), routed via the enabled complementer (36), has a binary value greater than the other substring (B) and which indicates, in the alternative case of such carry signal being absent, that the other substring is greater.

5. The processor of claim 1, with the feature that a scoring logic (60) exhibits a circuit (64) that determines the priority of the output signals (EA,EB,MC) from the comparator unit (24) and the logic unit (22), indicating in each case the lowest byte position in which a match is detected with the end-of-string character (E) for one or other (A or B) substring or both substrings, and indicating in each case on output bus (100) the lowest byte position where a mismatch has been detected.

6. The processor of claim 1, with the feature that a carry scoring logic (66) is provided, which comprises select circuits (91, 92, 93) controlled by carry signals from the arithmetic unit for generating signals A LESS THAN B and B LESS THAN A on output lines (95, 96).

7. The processor of claim 1, with the feature that the output signals EA, EB, EAB, A LESS THAN B and B LESS THAN A on output lines (98, 99, 97, 95, 96) serve to set condition codes (CC) which, together with the byte position indicated on the output bus (100), are stored for reuse by program instructions following the character string instruction that has been executed.

* * * * *